US011930231B2

(12) United States Patent
Bertrand

(10) Patent No.: US 11,930,231 B2
(45) Date of Patent: Mar. 12, 2024

(54) DIGITAL DISPLAY METHOD AND SYSTEM, DIGITAL DISPLAY DEVICE AND DIGITAL DISPLAY SERVER

(71) Applicant: JCDecaux SA, Neuilly sur Seine (FR)

(72) Inventor: Ludovic Bertrand, Breval (FR)

(73) Assignee: JCDecaux SA, Neuilly sur Seine (FR)

( * ) Notice: Subject to any disclaimer, the term of this patent is extended or adjusted under 35 U.S.C. 154(b) by 0 days.

(21) Appl. No.: 17/574,839

(22) Filed: Jan. 13, 2022

(65) Prior Publication Data

US 2022/0224959 A1 Jul. 14, 2022

(30) Foreign Application Priority Data

Jan. 13, 2021 (FR) ..................................... 21 00310

(51) Int. Cl.

| | |
|---|---|
| ***H04N 21/262*** | (2011.01) |
| ***H04N 21/222*** | (2011.01) |
| ***H04N 21/235*** | (2011.01) |
| ***H04N 21/258*** | (2011.01) |
| ***H04N 21/61*** | (2011.01) |

(52) U.S. Cl.
CPC ..... *H04N 21/26258* (2013.01); *H04N 21/222* (2013.01); *H04N 21/2353* (2013.01); *H04N 21/25875* (2013.01); *H04N 21/6131* (2013.01)

(58) Field of Classification Search
CPC ........... H04N 21/26258; H04N 21/222; H04N 21/2353; H04N 21/25875; H04N 21/6131
See application file for complete search history.

(56) References Cited

U.S. PATENT DOCUMENTS

| | | | |
|---|---|---|---|
| 6,424,998 | B2 | 7/2002 | Hunter |
| 8,095,950 | B1 | 1/2012 | Lapcevic |
| 9,202,234 | B2 | 12/2015 | Bourret et al. |
| 9,886,697 | B1 | 2/2018 | Sivertsen |
| 10,216,384 | B2 | 2/2019 | Madgwick et al. |
| 10,491,933 | B2 | 11/2019 | Wilson et al. |
| 10,523,988 | B2 | 12/2019 | Sinohara et al. |
| 10,609,178 | B2 | 3/2020 | Navarro et al. |
| 10,810,353 | B2 | 10/2020 | Clopp et al. |
| 2008/0091497 | A1 | 4/2008 | Julien et al. |

(Continued)

FOREIGN PATENT DOCUMENTS

| | | | |
|---|---|---|---|
| CN | 101751819 | A | 6/2010 |
| CN | 102624883 | A | 8/2012 |

(Continued)

OTHER PUBLICATIONS

French Search Report related to Application No. 21 00310; dated Sep. 23, 2021.

(Continued)

*Primary Examiner* — Joshua D Taylor
(74) *Attorney, Agent, or Firm* — von Briesen & Roper, s.c.

(57) ABSTRACT

A digital display method for controlling the display of digital content items by digital display devices, comprising:
- generating, by a server, playlists comprising digital content identifiers and download manifests comprising loading addresses of digital content items;
- updating the playlists and download manifests of digital display devices from the server;
- reading, by each digital display device, the digital content items corresponding to its playlist.

18 Claims, 2 Drawing Sheets

(56) References Cited

U.S. PATENT DOCUMENTS

| | | | |
|---|---|---|---|
| 2009/0276317 | A1 | 11/2009 | Dixon et al. |
| 2009/0300028 | A1 | 12/2009 | Ben Natan |
| 2010/0118200 | A1 | 5/2010 | Gelman et al. |
| 2012/0210225 | A1 | 8/2012 | McCoy et al. |
| 2013/0318186 | A1 | 11/2013 | LeBlanc et al. |
| 2013/0325611 | A1 | 12/2013 | Delug |
| 2014/0129939 | A1 | 5/2014 | Story et al. |
| 2014/0278975 | A1 | 9/2014 | Lee et al. |
| 2014/0379871 | A1* | 12/2014 | Van Brandenburg ........................ H04L 65/613 709/219 |
| 2015/0085875 | A1* | 3/2015 | Phillips ................. H04L 65/765 370/465 |
| 2016/0351189 | A1 | 12/2016 | Miller et al. |
| 2017/0092225 | A1 | 3/2017 | Morris et al. |
| 2017/0332113 | A1 | 11/2017 | Haritaoglu et al. |
| 2018/0091568 | A1 | 3/2018 | Edgington, Jr. |
| 2018/0278990 | A1 | 9/2018 | Rutland et al. |
| 2019/0034981 | A1 | 1/2019 | Basra et al. |
| 2019/0095959 | A1 | 3/2019 | Yu |
| 2019/0266642 | A1 | 8/2019 | Orr et al. |
| 2020/0104533 | A1 | 4/2020 | Mick, Sr. et al. |
| 2020/0275168 | A1* | 8/2020 | Merchant ................ G06F 21/64 |
| 2022/0103883 | A1* | 3/2022 | Cunningham ..... H04N 21/8456 |
| 2022/0167043 | A1* | 5/2022 | Kim ................... H04N 21/4331 |

FOREIGN PATENT DOCUMENTS

| | | | |
|---|---|---|---|
| CN | 101751819 | B | 12/2012 |
| CN | 105184614 | A | 12/2015 |
| CN | 107180360 | A | 9/2017 |
| CN | 107181970 | A | 9/2017 |
| CN | 108011910 | A | 5/2018 |
| CN | 109302624 | A | 2/2019 |
| EP | 898772 | A1 | 3/1999 |
| EP | 3016056 | A1 | 5/2016 |
| EP | 3068102 | A1 | 9/2016 |
| EP | 3239916 | A1 | 11/2017 |
| EP | 3324264 | A1 | 5/2018 |
| IN | 286375 | B | 3/2010 |
| JP | 6591470 | B2 | 10/2019 |
| KR | 20180020607 | A | 2/2018 |
| WO | 200051101 | A1 | 8/2000 |
| WO | 200051102 | A1 | 8/2000 |
| WO | 200515362 | A2 | 2/2005 |
| WO | 2009105811 | A1 | 9/2009 |
| WO | 2009144459 | A2 | 12/2009 |
| WO | 2010120375 | A1 | 10/2010 |
| WO | 2015145030 | A1 | 10/2015 |
| WO | 2015150461 | A1 | 10/2015 |

OTHER PUBLICATIONS

Swedish Search Report related to Application No. 2250001-1; dated Sep. 12, 2022.

Swedish Office Action related to Application No. 2250001-1; dated Sep. 12, 2022.

Hungarian Novelty Search Report related to Application No. P2200004; dated Jul. 25, 2022.

Danish Technical Examination related to Application No. PA 202170659; dated Jul. 18, 2022.

Spanish Search Report and Written Opinion related to Application No. 202230014; dated Nov. 28, 2022.

Irish Search Report related to Application No. 2022/0004; dated Nov. 28, 2022.

Manifest file. Wikipedia [online][retrieved Sep. 28, 2022]. Retrieved from Internet <URL:https://en.wikipedia.org/w/index.php?title=Manifest_file&oldid=962547770 >.

Finnish Search Report related to Application No. 20225001; dated Apr. 20, 2023.

Chinese first Office Action related to Application No. 202210016217.6; dated Apr. 23, 2023.

Spanish Office Action related to Application No. 202230014; dated Apr. 27, 2023.

Finnish Office Action related to Application No. 20225001; dated Apr. 20, 2023.

Digital video fingerprinting; https://en.wikipedia.org/w/index.php?title=Digital_video_fingerprinting&oldid=999463335.

Manifest file; https://en.wikipedia.org/w/index.php?title=Manifest_file&oldid=962547770.

HTTP Live Streaming: https://en.wikipedia.org/w/index.php?title=HTTP_Live_Streaming&oldid=995511548.

Office Action related to Application No. 202230014; dated Apr. 27, 2023.

* cited by examiner

DIGITAL DISPLAY METHOD AND SYSTEM, DIGITAL DISPLAY DEVICE AND DIGITAL DISPLAY SERVER

TECHNICAL FIELD

This description relates to digital display methods and systems, digital display devices, and digital display servers.

BACKGROUND

Digital display methods are known which allow the deployment of playlists and of content to digital display devices. WO2005/015362 relates to an example of such method.

SUMMARY

The aim of this description is in particular to improve the efficiency of these methods.

To this end, this description proposes a digital display method for controlling the display of digital content items by digital display devices, comprising:

a) generating, by at least one server, playlists based on display campaigns, each playlist being intended to be read by one or more of said digital display devices, each playlist comprising at least one series of identifiers of digital content items to be read but not comprising loading addresses of digital content items or digital fingerprints of digital content items;

b) generating, for each digital display device, by said at least one server, a download manifest comprising at least loading addresses of digital content items;

c) updating the playlists and download manifests by the digital display devices, comprising:

c1) polling said at least one server, at predetermined intervals, by each digital display device, in order to determine whether said at least one server has a new playlist and/or a new download manifest corresponding to said digital display device;

c2) if yes, loading said new playlist and/or said new download manifest on the digital display device;

c3) if a new download manifest has been loaded from the server, determining, by said digital display device, what new digital content item(s) are referenced in said download manifest;

c4) and downloading, by said digital display device, said new digital content item(s) from the address(es) indicated in the new download manifest;

d) reading, by each digital display device, the digital content items corresponding to a playlist in effect for this digital display device and displaying these digital content items on a digital screen belonging to said digital display device.

By means of these provisions, the proposed digital display method is particularly efficient and economical in bandwidth. In fact, it requires transmitting from the server to the digital display devices only distribution lists and download manifests which are small in volume, and only when these have been modified. In addition, part of the modifications to playlists do not result in any modification in the download manifest (in particular when the modifications concern the read order or the read frequency of content already present in the previous download manifest, according to dynamic modifications of the display campaigns), which eliminates some sending of the download manifests, which are larger than the playlists.

In various embodiments of the digital display method, recourse may optionally also be made to one or more of the following provisions (alone or in any combination, possibly independently of the aforementioned provisions):

Each playlist and each download manifest is loaded in an encrypted manner by the digital display devices, which improves the security of the method;

Each download manifest comprises at least one reference digital fingerprint for each digital content item referenced in said download manifest, and during step c4), the digital display device determines a digital fingerprint calculated from the downloaded new digital content item, verifies that the calculated digital fingerprint matches the reference digital fingerprint, and validates the downloaded digital content item only if the calculated digital fingerprint matches the reference digital fingerprint, which improves the security of the method;

In step c4), the digital display device downloads the new digital content item in an unencrypted manner;

In step c4), the digital display device downloads the new digital content item through a proxy server which is in a local area network with said display device and with other digital display devices, which improves performance in downloading digital content;

In step c4), the digital display device downloads the new digital content item in chunks, which improves performance in downloading digital content items;

In step c1), each digital display device polls said at least one server at a predetermined address specific to said digital display device, which improves the security of the method;

Each digital display device communicates with said at least one server and downloads new content items via a mobile telephone network.

Furthermore, this description also relates to a digital display system comprising at least one server and multiple digital display devices, wherein:

said at least one server is adapted to generating playlists based on display campaigns, each playlist being intended to be read by one or more of said digital display devices, each playlist comprising at least one series of identifiers of digital content items to be read but not comprising loading addresses of digital content items or digital fingerprints of digital content items;

said at least one server is adapted to generating, for each digital display device, a download manifest comprising at least loading addresses of digital content items;

the digital display devices are adapted to updating their playlists and download manifests, this updating comprising:

c1) polling said at least one server, at predetermined intervals, by each digital display device, in order to determine whether said at least one server has a new playlist and/or a new download manifest corresponding to said digital display device;

c2) if yes, loading said new playlist and/or said new download manifest on the digital display device;

c3) if a new download manifest has been loaded from the server, determining, by said digital display device, what new digital content item(s) are referenced in said download manifest;

c4) and downloading, by said digital display device, said new digital content item(s) from the address(es) indicated in the new download manifest;

each digital display device is adapted to reading the digital content items corresponding to a playlist in effect for this digital display device and for displaying these digital content items on a digital screen belonging to said digital display device.

In various embodiments of the digital display system, recourse may optionally be made to one or more of the following provisions (alone or in any combination, possibly independently of the aforementioned provisions):

The digital display devices are adapted to loading each playlist and each download manifest in an encrypted manner;

Each download manifest comprises at least one reference digital fingerprint for each digital content item referenced in said download manifest, and during the downloading of each new digital content item, the digital display device is adapted to determining a digital fingerprint calculated from the downloaded new digital content item, verifying that the calculated digital fingerprint matches the reference digital fingerprint, and validating the downloaded digital content item only if the calculated digital fingerprint matches the reference digital fingerprint;

The digital display device is adapted to downloading the new digital content items in an unencrypted manner;

Several of the digital display devices belong to a local area network also comprising a proxy server, and each digital display device in the local area network is adapted to downloading the new digital content items through said proxy server;

Each digital display device is adapted to downloading new digital content items in chunks;

Each digital display device is adapted to polling said at least one server at a predetermined address specific to said digital display device;

Each digital display device is adapted to communicating with said at least one server and for downloading new content items via a mobile telephone network.

Furthermore, this description also relates to a digital display device comprising a digital screen and having in memory at least:

- a playlist comprising at least one series of identifiers of digital content items to be read but not comprising loading addresses of digital content items or digital fingerprints of digital content items;
- a download manifest comprising at least loading addresses of digital content items; said digital display device being adapted to:
- updating its playlist and download manifest, this updating comprising:

c1) polling at least one server, at predetermined intervals, in order to determine whether said at least one server has a new playlist and/or a new download manifest corresponding to said digital display device;

c2) if yes, loading said new playlist and/or said new download manifest on the digital display device;

c3) if a new download manifest has been loaded, determining, by said digital display device, what new digital content item(s) are referenced in said download manifest;

c4) and downloading, by said digital display device, said new digital content item(s) from the address(es) indicated in the new download manifest;

- reading the digital content items corresponding to the playlist and displaying these digital content items on said digital screen.

In various embodiments of the digital display device, recourse may optionally be made to one or more of the following provisions (alone or in any combination, possibly independently of the aforementioned provisions):

The digital display device is adapted to loading each playlist and each download manifest in an encrypted manner;

Each download manifest comprises at least one reference digital fingerprint for each digital content item referenced in said download manifest, and during the downloading of each new digital content item, the digital display device is adapted to determining a digital fingerprint calculated from the downloaded new digital content item, verifying that the calculated digital fingerprint matches the reference digital fingerprint, and validating the downloaded digital content item only if the calculated digital fingerprint matches the reference digital fingerprint;

The digital display device is adapted to downloading the new digital content items in an unencrypted manner;

The digital display device belongs to a local area network which also comprises a proxy server and several other digital display devices, and said digital display device is adapted to downloading the new digital content items through said proxy server;

The digital display device is adapted to downloading new digital content items in chunks;

The digital display device is adapted to polling said at least one server at a predetermined address.

The digital display device is adapted to communicating with said at least one server and for downloading new content items via a mobile telephone network.

Finally, this description also relates to a digital display server adapted to:

- generating playlists based on display campaigns, each playlist being intended to be read by one or more of said digital display devices, each playlist comprising at least one series of identifiers of digital content items to be read but not comprising loading addresses of digital content items or digital fingerprints of digital content items;
- generating, for each digital display device, a download manifest comprising at least loading addresses of digital content items;
- allowing the digital display devices to update their playlists and download manifests, this updating comprising: polling said server at predetermined intervals in order to determine whether said at least one server has a new playlist and/or a new download manifest corresponding to each digital display device and if yes, allowing said digital display device to load said new playlist and/or said new download manifest.

In various embodiments of the digital display device, recourse may optionally be made to one or more of the following provisions (alone or in any combination, possibly independently of the aforementioned provisions):

The digital display server is adapted to allowing the digital display devices to load each playlist and each download manifest in an encrypted manner;

Each download manifest comprises at least one reference digital fingerprint for each digital content item referenced in said download manifest;

The digital display server comprises a predetermined address, specific to each display device, adapted to receiving requests from said digital display device.

BRIEF DESCRIPTION OF DRAWINGS

Other features and advantages of the digital display method, the digital display system, the digital display device, and the digital display server will become apparent from the following description of two of their embodiments, given as non-limiting examples, with reference to the attached drawings.

In the drawings.

MORE DETAILED DESCRIPTION

In the various figures, the same references designate identical or similar elements.

Figure 1:
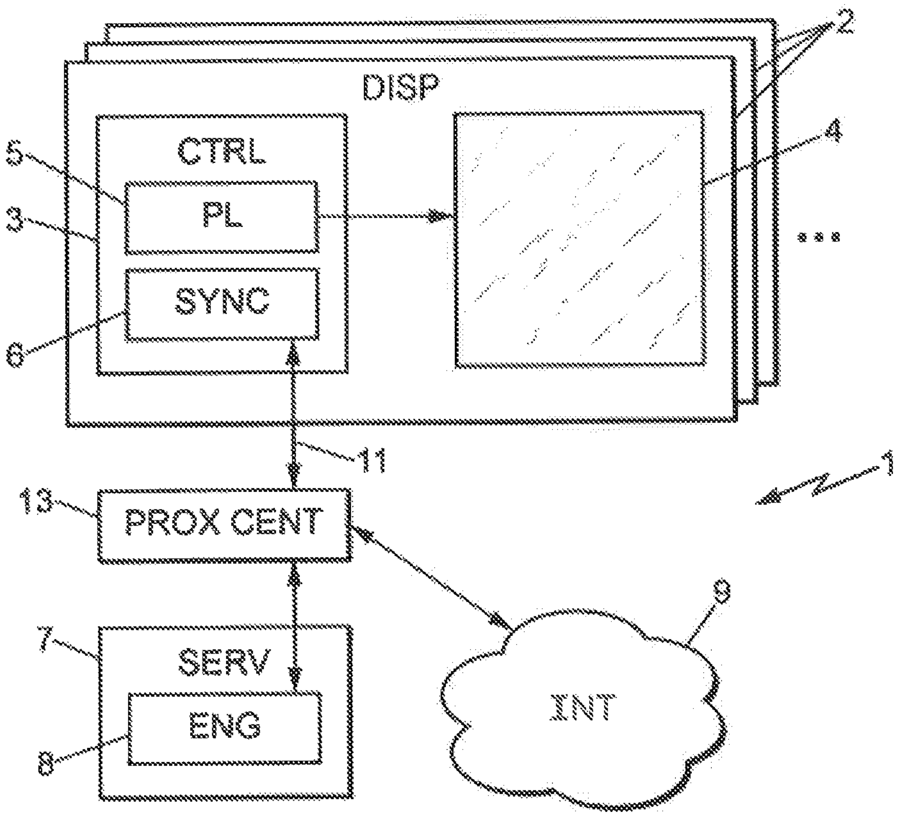
FIG. 1 is a schematic view showing a digital display system according to one embodiment.

FIG. 1 shows a digital display system 1 comprising at least one server 7 (SERV) and some digital display devices 2 (DISP). For clarity, the following description refers to one server 7, but the functions of the server 7 described below could be distributed across multiple servers 7.

Each display device 2 comprises a control device 3 (CTRL) such as a microcomputer or the like, which controls a digital screen 4.

The control device 3 executes a digital content reader 5 (PL) (software module executed by the control device 3) and also executes a synchronization module (software) 6 (SYNC).

The server 7 executes in particular an engine 8 (ENG) for generating lists of content items and download manifests.

The synchronization module 6 of each digital display device 2 communicates with the server 7 and where necessary with other resources possibly on the Internet 9 (INT). In the embodiment shown, the digital display devices 2 communicate with the server(s) 7 and with said other resources through a central proxy server 13 (PROX CENT).

This communication can occur via any wide area network (WAN—links denoted 11 in FIG. 1). For example, in many cases this communication is made via a mobile telephone network (broadband cellular network, for example of the 3G or 4G type). Of course, any other mode of communication is possible.

The engine 8 of the server 7 is adapted to generating playlists (a), repetitively and/or according to certain operative events (change in programming, content, etc.), according to the display campaigns. This generation of playlists is carried out based on reservations made by advertisers concerning the different display devices 2, based on the digital content items to be played for these display campaigns, and based on the digital display devices available.

Each playlist is intended to be read by one or more of said digital display devices.

Each playlist comprises at least one series of identifiers of digital content items to be read sequentially, over one or more predetermined time periods.

The playlist does not comprise loading addresses of digital content items or digital fingerprints of digital content items; it is therefore a document representing a small volume of data.

The engine 8 of the server 7 is also adapted to generating a download manifest (b), repetitively and/or according to certain operative events (change in programming, content, etc.), for each digital display device, said download manifest (b) comprising at least loading addresses of the digital content items referenced in the loading list. Each download manifest may further comprise, for each digital content item, the identifier comprised in the playlist.

Each download manifest may further comprise at least one reference digital fingerprint, meaning a digital signature, for each digital content item referenced in said download manifest. According to one example, the digital fingerprint may be a checksum, for example of the "MD5" type. According to another example, the digital fingerprint may be a digital signature of the "GPG" type. According to a third example, the download manifest may further comprise two reference digital fingerprints for each digital content item, in particular a checksum for example of the "MD5" type and a more complex digital signature, for example of the "GPG" type.

In general, the digital fingerprint (digital signature) can be of any known type, ranging from a simple hash function or a checksum to a complex signature of the "GPG" type or the like.

The frequency of the generation of playlists and download manifests by the engine 8 may be variable depending on the speed at which new reservations or changes in reservations by advertisers come in. This frequency can be as high as once every few minutes, or at even higher frequencies, knowing that part of the reservations may be made by automatic online auctions. As explained above, some updates to playlists are made without changing the download manifest when the changes relate, for example, to the read order or read frequency of digital content items, or to the conditions for reading digital content items.

The synchronization modules 6 of the digital display devices 2 are adapted to updating their playlists and download manifests (c), based on the engine 8 of the server 7.

This updating may comprise the following steps:

c1) The synchronization module 6 of the display device 2 polls the engine 8 of the server 7 by sending a request at predetermined intervals, in order to determine whether the server 7 has a new playlist and/or a new download manifest corresponding to the digital display device 2. The polling frequency of the engine 8 may be fixed (for example every few minutes) or determined by a playlist and/or a download manifest previously downloaded from the engine 8. For example, the polling frequency of the engine 8 for playlists may be fixed (e.g. every few minutes, in particular every 5 minutes) and the polling frequency of the engine 8 for download manifests may be included in the playlists. The playlists and download manifests may be time stamped, and in order to determine whether the server 7 has a new playlist corresponding to the digital display device 2, the synchronization module 6 can send a request to the engine 8 to receive the time stamp of the playlist in effect for the digital display device 2. If this timestamp is more recent than the timestamp of the last playlist downloaded by the digital display device 2, then it is determined that engine 8 of the server 7 has a new playlist corresponding to the digital display device 2. The same procedure is carried out for the download manifests.

c2) If it is determined that the engine 8 has a new playlist corresponding to the digital display device 2 and/or a new download manifest, the synchronization module loads the new playlist and/or the new download manifest from the engine 8 of the server 7 (by sending a request asking to receive the new playlist and/or the new download manifest).

c3) If a new download manifest has been loaded from the server 7, the synchronization module 6 of the digital display device 2 determines what new digital content item(s) are referenced in the new download manifest. This determination can be made for example by comparing the digital fingerprints of the digital content items referenced in the new download manifest with the digital fingerprints of the digital content items already present in the memory of the digital display device 2.

c4) The synchronization module 6 of the digital display device 2 then downloads said new digital content item(s) from the URL address(es) corresponding to each digital content item indicated in the new download manifest. In general, this downloading is done via the Internet 9. The URL addresses in question may correspond to the server 7, to another server specific to the operator of the server 7, or to another location on the Internet.

The reader 5 of each digital display device 2 is adapted to reading the digital content items corresponding to its playlist in effect (last playlist loaded by the synchronization module 6) and displaying these digital content items on the digital screen 4 of the digital display device 2.

In steps (c1) and (c2), the synchronization module 6 of each digital display device 2 always sends its requests to the same URL address, which is specific to the digital display device 2.

In steps (c1) and (c2), the synchronization module 6 and the engine 8 of the server 7 may advantageously communicate in an encrypted manner, for example using the "https" protocol.

In step (c4), the synchronization module 6 of the digital display device 2 determines a digital fingerprint calculated from the downloaded new digital content item, verifies that the calculated digital fingerprint matches the reference digital fingerprint contained in the download manifest, and validates the downloaded digital content item only if the calculated digital fingerprint matches the reference digital fingerprint. If the downloaded digital content item is not validated, it is destroyed. If the downdownload manifest contains two (or more) digital fingerprints for at least some digital content items, this validation can be performed for the different digital fingerprints of the digital content item, sequentially or in parallel.

In step (c4), the synchronization module 6 of the digital display device 2 may download the new digital content items in an unencrypted manner, for example using the "http" protocol.

In step (c4), the synchronization module 6 of the digital display device 2 may, in one embodiment, download the new digital content items in chunks.

Figure 2:
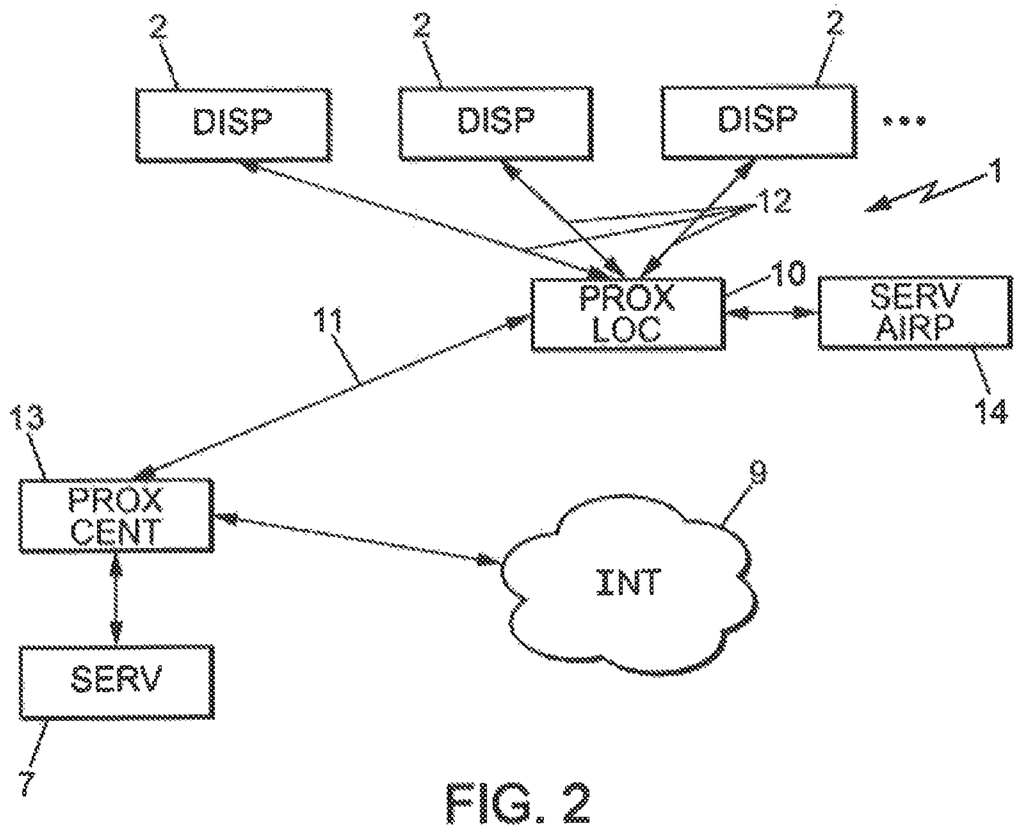
FIG. 2 is a schematic view showing a digital display system according to another embodiment.

The embodiment shown in FIG. 2 is similar to that of FIG. 1 and will therefore not be described again in detail. This embodiment of FIG. 2 differs from that of FIG. 1 by the fact that several of the digital display devices 2 belong to a local area network (link 12) also comprising a content proxy server 10 (PROX LOC), and the synchronization module of each digital display device 2 of the local area network is adapted to downloading new digital content items through said proxy server 10. The proxy server 10 thus loads each new content item only once via link 11 which may optionally be of relatively low speed or of relatively low quality, then distributes this content to the various digital display devices 2 of the local area network, via the higher speed and/or better quality links 12 of the local area network. The proxy server 10 may optionally also communicate with a local server 14 (SERV AIRP), for example specific to an airport.

The invention claimed is:

1. An advertisement digital display method for controlling the display of digital content items by digital display devices, comprising:

a) generating, by at least one server, playlists based on advertisement display campaigns, each playlist being intended to be read by one or more of said digital display devices, each playlist comprising at least one series of identifiers of digital content items to be read sequentially over one or more predetermined time periods, but not comprising loading addresses of digital content items or digital fingerprints of digital content items, each digital display device corresponding to one specific predetermined playlist generated by said at least one server;

b) generating, for each digital display device, by said at least one server, a respective download manifest comprising at least respective loading addresses of digital content items, said download manifests being larger files than said playlists and being generated less frequently than said playlists by said at least one server;

c) updating the playlists and download manifests by the digital display devices, comprising:

c1) polling said at least one server, at predetermined intervals, by each digital display device, in order to determine whether said at least one server has a new playlist corresponding to said digital display device and to determine whether said at least one server has a new download manifest corresponding to said digital display device;

c2) if and only if it is determined that said at least one server has a new playlist for said digital display device, then loading said new playlist on the digital display device; if and only if it is determined that said at least one server has a new download manifest for said digital display device, then loading said new download manifest on the digital display device;

c3) if a new download manifest has been loaded from the server, determining, by said digital display device, what new digital content item(s) are referenced in said new download manifest;

c4) downloading, by said digital display device, said new digital content item(s) from the corresponding respective address(es) indicated in the new download manifest, and storing said new digital content item(s) on said digital display device;

d) reading, by each digital display device, the digital content items previously downloaded and corresponding to a playlist in effect for this digital display device and displaying these digital content items on a digital screen belonging to said digital display device.

2. Method according to claim 1, wherein each playlist and each download manifest is loaded in an encrypted manner by the digital display devices.

3. The method according to claim 2, wherein each download manifest comprises at least one reference digital fingerprint for each digital content item referenced in said download manifest, and during step c4), the digital display device determines a digital fingerprint calculated from the downloaded new digital content item, verifies that the calculated digital fingerprint matches the reference digital fingerprint, and validates the downloaded digital content item only if the calculated digital fingerprint matches the reference digital fingerprint.

4. The method according to claim 3, wherein, in step c4), the digital display device downloads the new digital content item in an unencrypted manner.

5. The method according to claim 4, wherein, in step c4), the digital display device downloads the new digital content item through a proxy server which is in a local area network with said display device and with other digital display devices.

6. The method according to claim 3, wherein, in step c4), the digital display device downloads the new digital content item in chunks.

7. The method according to claim 1, wherein, in step c1), each digital display device polls said at least one server at a predetermined address specific to said digital display device.

8. The method according to claim 1, wherein each digital display device communicates with said at least one server and downloads the new content items via a mobile telephone network.

9. An advertisement digital display system comprising at least one server and multiple digital display devices, wherein:

said at least one server is adapted to generating playlists based on advertisement display campaigns, each playlist being intended to be read by one or more of said digital display devices, each playlist comprising at least one series of identifiers of digital content items to be read sequentially over one or more predetermined time periods, but not comprising loading addresses of digital content items or digital fingerprints of digital content items, each digital display device corresponding to one specific playlist generated by said at least one server;

said at least one server is adapted to generating repetitively, for each digital display device, a respective download manifest comprising at least respective loading addresses of digital content items, said download manifests being larger files than said playlists and being generated less frequently than said playlists by said at least one server;

the digital display devices are adapted to updating their playlists and download manifests, this updating comprising:

c1) polling said at least one server, at predetermined intervals, by each digital display device, in order to determine whether said at least one server has a new playlist corresponding to said digital display device and to determine whether said at least one server has a new download manifest corresponding to said digital display device;

c2) if it is determined that said at least one server has a new playlist for said digital display device, then loading said new playlist on the digital display device; if it is determined that said at least one server has a new download manifest for said digital display device, then loading said new download manifest on the digital display device;

c3) if a new download manifest has been loaded from the server, determining, by said digital display device, what new digital content item(s) are referenced in said new download manifest;

c4) and downloading, by said digital display device, said new digital content item(s) from the corresponding respective address(es) indicated in the new download manifest, and storing said new digital content item(s) on said digital display device;

each digital display device is adapted to reading the digital content items previously downloaded and corresponding to a playlist in effect for this digital display device and for displaying these digital content items on a digital screen belonging to said digital display device.

10. The system according to claim 9, wherein the digital display devices are adapted to loading each playlist and each download manifest in an encrypted manner.

11. The system according to claim 10, wherein each download manifest comprises at least one reference digital fingerprint for each digital content item referenced in said download manifest, and during the downloading of each new digital content item, the digital display device is adapted to determining a digital fingerprint calculated from the downloaded new digital content item, verifying that the calculated digital fingerprint matches the reference digital fingerprint, and validating the downloaded digital content item only if the calculated digital fingerprint matches the reference digital fingerprint.

12. The system according to claim 11, wherein the digital display device is adapted to downloading the new digital content items in an unencrypted manner.

13. The system according to claim 12, wherein several of the digital display devices belong to a local area network also comprising a proxy server, and each digital display device in the local area network is adapted to downloading the new digital content items through said proxy server.

14. The system according to claim 11, wherein each digital display device (2) is adapted to downloading the new digital content items in chunks.

15. The system according to claim 9, wherein each digital display device is adapted to polling said at least one server at a predetermined address specific to said digital display device.

16. The system according to claim 9, wherein each digital display device is adapted to communicating with said at least one server and for downloading new content items via a mobile telephone network.

17. An advertisement digital display device comprising a digital screen and having in memory at least:

a playlist comprising at least one series of identifiers of digital content items to be read sequentially over one or more predetermined time periods, but not comprising loading addresses of digital content items or digital fingerprints of digital content items;

a download manifest comprising at least respective loading addresses of digital content items;

said digital display device being adapted to:

updating its playlist and download manifest, this updating comprising:

c1) polling at least one server at predetermined intervals, in order to determine whether said at least one server has a new playlist corresponding to said digital display device and to determine whether said at least one server has a new download manifest corresponding to said digital display device, said download manifest being a larger file than said playlist and being generated less frequently than said playlist;

c2) if it is determined that said at least one server has a new playlist for said digital display device, then loading said new playlist on the digital display device; if it is determined that said at least one server has a new download manifest for said digital display device, then loading said new download manifest on the digital display device;

c3) if a new download manifest has been loaded, determining, by said digital display device, what new digital content item(s) are referenced in said new download manifest;

c4) and downloading, by said digital display device, said new digital content item(s) from the corresponding respective address(es) indicated in the new download manifest, and storing said new digital content item(s) on said digital display device;

reading the digital content items previously downloaded and corresponding to the playlist and displaying these digital content items on said digital screen.

18. An advertisement digital display server adapted to:

generating playlists based on advertisement display campaigns, each playlist being intended to be read by one or more of said digital display devices, each playlist comprising at least one series of identifiers of digital content items to be read sequentially over one or more predetermined time periods, but not comprising loading addresses of digital content items or digital fingerprints of digital content items, each digital display device corresponding to one specific playlist generated by said at least one server;

repetitively generating, for each digital display device, a download manifest comprising at least respective loading addresses of digital content items, said download manifests being larger files than said playlists and being generated less frequently than said playlists by said at least one server;

allow the digital display devices to update their playlists and download manifests, this updating comprising: polling said server at predetermined intervals in order to determine whether said at least one server has a new playlist corresponding to each digital display device and to determine whether said at least one server has a new download manifest corresponding to each digital display device, and if it is determined that said at least one server has a new playlist for said digital display device, then loading said new playlist on the digital display device; if it is determined that said at least one server has a new download manifest for said digital display device, then loading said new download manifest.

* * * * *